C. F. WEST.
SNELLED FISH HOOK HOLDER.
APPLICATION FILED JULY 24, 1908.

909,722.

Patented Jan. 12, 1909.

UNITED STATES PATENT OFFICE.

CHARLES F. WEST, OF PHILADELPHIA, PENNSYLVANIA.

SNELLED-FISH-HOOK HOLDER.

No. 909,722.    Specification of Letters Patent.    Patented Jan. 12, 1909.

Application filed July 24, 1908. Serial No. 445,097.

*To all whom it may concern:*

Be it known that I, CHARLES F. WEST, a citizen of the United States, residing in the city and county of Philadelphia, State of Pennsylvania, have invented a new and useful Snelled-Fish-Hook Holder, of which the following is a specification.

My invention consists of a holder for a snelled fish hook embodying a socket for the hook, a clamp for the snell thereof, and a carrier for said members, thus producing a practical, easily operated, effective and inexpensive device, as will be hereinafter more fully explained.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1:
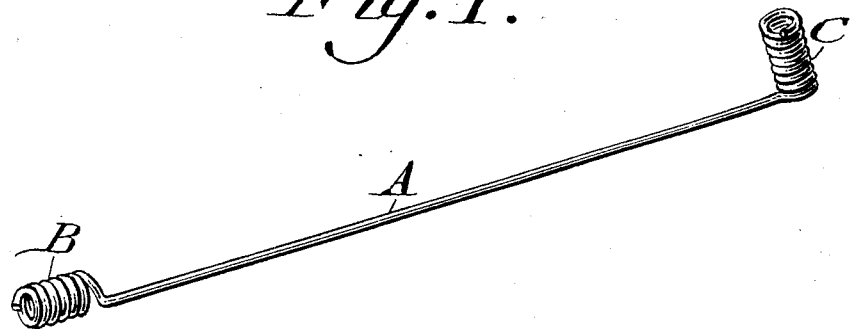
Figure 2:
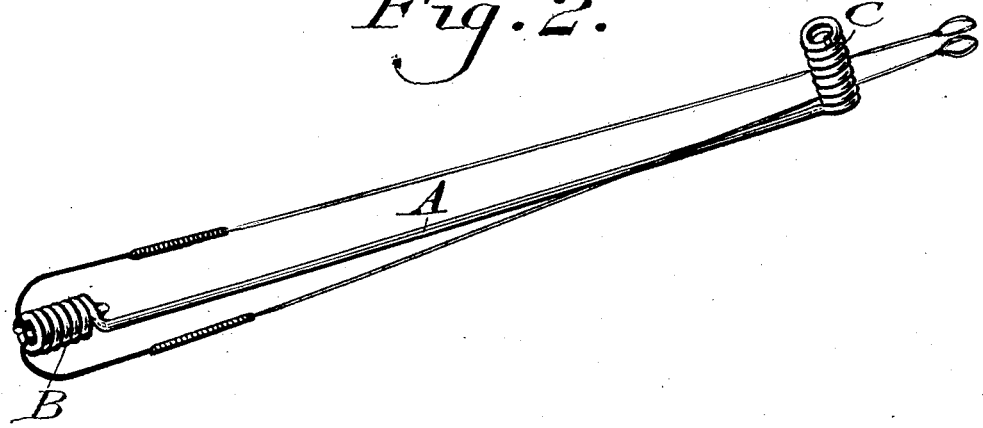

Figure 1 represents a perspective view of a snelled fish hook holder embodying my invention. Fig. 2 represents a similar view with snelled fish hooks applied thereto.

Similar letters of reference indicate corresponding parts in the figures.

Referring to the drawings:—A designates a bar, which constitutes the shank of the device, the same having at opposite ends the socket B and clamp C. In practice, said members A, B, and C are composed of a continuous piece of wire, the members B, C being formed by coiling the wire into spiral shape, the member B extending in the longitudinal direction of the shank, and the member C extending transversely thereto.

The member B constitutes a receiver for the points of fish hooks, while the bodies of the latter bear against the lower end of said member and so control said points in the member. The member C has its coils or convolutions adapted to receive between them the snells of the fish hooks, and so by their resiliency clamp the same, it being seen that when the hooks are located and engaged primarily in the socket B, the snells are directed along the shank A to the clamp C, and when they are drawn taut, somewhat resiliently, due to the coils of the socket, they are forced between adjacent convolutions of said clamp, whereby the latter controls the snells, and as the socket controls the hooks, it is evident that the snelled fish hooks may be nicely, conveniently and safely carried in a pocket, package or other receptacle, it being seen that the inner end of the socket sufficiently removes the points of the hooks from injurious contact of the hand thereagainst and prevents said points from being caught in surrounding objects, while portions of the snells extend along the shank, which latter is sufficiently rigid so as to be prevented from folding, and thus bending, folding and creasing of said snells are also prevented, while the coils keep such portions stretched taut.

It is evident also that a snell may be readily drawn out and so removed from the convolutions of the clamp, when the hook of said snell may be disengaged from the socket, thus completely disconnecting the snelled fish hook from the holder.

The bar or shank A supports the socket and clamp, and properly spaces them apart, and the clamp is adapted to take hold of snells of different lengths.

Having thus described my invention, what I claim as new and desire to secure by Letters Patent, is:—

1. A holder for a snelled fish hook embodying a socket, a clamp, and a carrier, said socket and clamp being on opposite ends of said carrier, the several members named being integral of a continuous piece of material.

2. A holder for a snelled fish hook composed of a bar, a coil socket and a coil clamp, said socket and clamp being on opposite ends of said bar, the several members named being continuous of each other and formed of wire.

3. A holder for a snelled fish hook composed of a socket member, a clamp member, and a longitudinally extending-carrier member, said socket member extending in the longitudinal direction of said carrier, and said clamp member extending in the transverse direction thereof, both socket and clamp members being of coil - construction and the several members named formed of a continuous piece of material.

4. A holder for a snelled fish hook composed of a socket, a clamp, and a carrier for said members, said socket and clamp members being of resilient construction and continuities of said carrier.

CHARLES F. WEST.

Witnesses:
JOHN A. WIEDERSHEIM,
HARRY C. DALTON.